United States Patent [19]
Eckersley et al.

[11] Patent Number: 5,297,645
[45] Date of Patent: Mar. 29, 1994

[54] INDUSTRIAL LIFT TRUCK
[75] Inventors: Paul J. Eckersley; Keith F. Messer, both of Basingstoke, United Kingdom
[73] Assignee: Linde Aktiengesellschaft, Fed. Rep. of Germany
[21] Appl. No.: 19,090
[22] Filed: Feb. 18, 1993
[30] Foreign Application Priority Data
Feb. 19, 1992 [GB] United Kingdom ............... 9203545
Dec. 15, 1992 [GB] United Kingdom ............... 9226126
[51] Int. Cl.$^5$ ............................................. B60R 16/04
[52] U.S. Cl. ................................. 180/68.5; 187/9 R; 248/503
[58] Field of Search .............. 187/9 R, 9 E; 414/629, 414/631; 180/68.5; 224/902, 273; 245/503

[56] References Cited
U.S. PATENT DOCUMENTS

| | | | |
|---|---|---|---|
| 2,327,848 | 8/1943 | Schroeder | 187/9 R |
| 2,916,172 | 12/1959 | Locke | 187/9 R |
| 4,520,903 | 6/1985 | Arnold et al. | 187/9 R |
| 4,991,674 | 2/1991 | Fullenkamp | 180/68.5 |

Primary Examiner—Kenneth W. Noland
Attorney, Agent, or Firm—Webb, Burden, Ziesenheim & Webb

[57] ABSTRACT

An industrial lift truck having a body which includes a battery container cover, spaced straddle legs projecting from the body and a lift mast which moves along the straddle legs. The lift mast is moved along the straddle legs by a mechanism operated by a battery which is held in a container. The container is supported on a platform resting on the straddle legs and is moved along the straddle legs between a rear stored position and a forward open position by a hydraulic cylinder and piston. A guide arrangement for the battery container is located below the cover and is disposed internally of the end walls of the battery container to contact the inner surfaces of the end walls to direct the battery container during movement into the rear stored position and to prevent movement of the battery container transversely of the straddle legs when it is in the rear stored position.

20 Claims, 6 Drawing Sheets

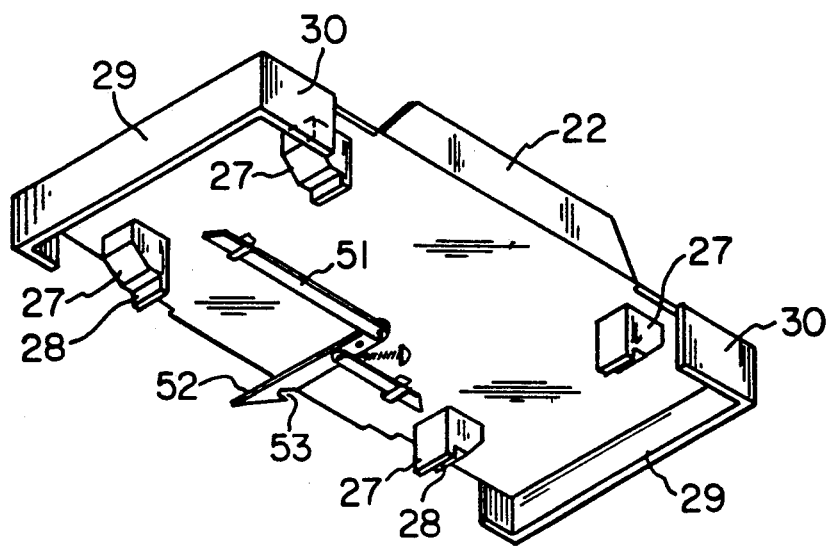
FIG. 6
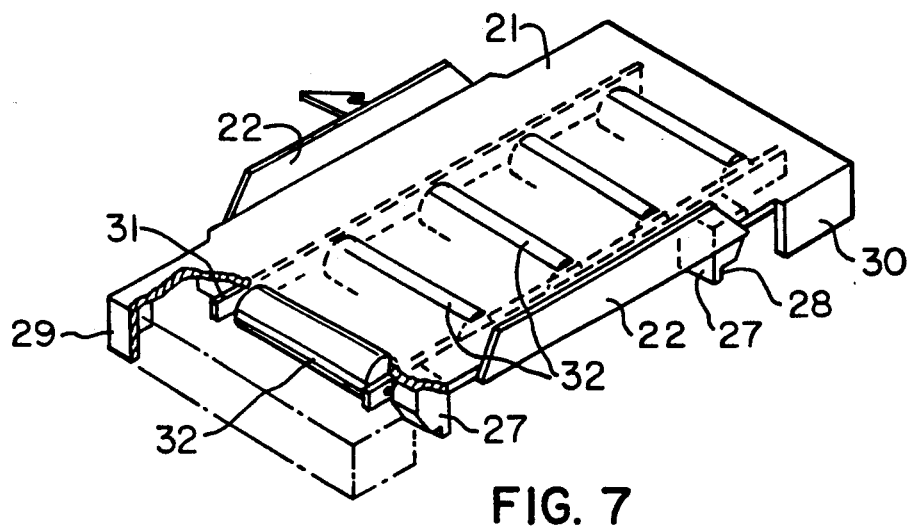
FIG. 7
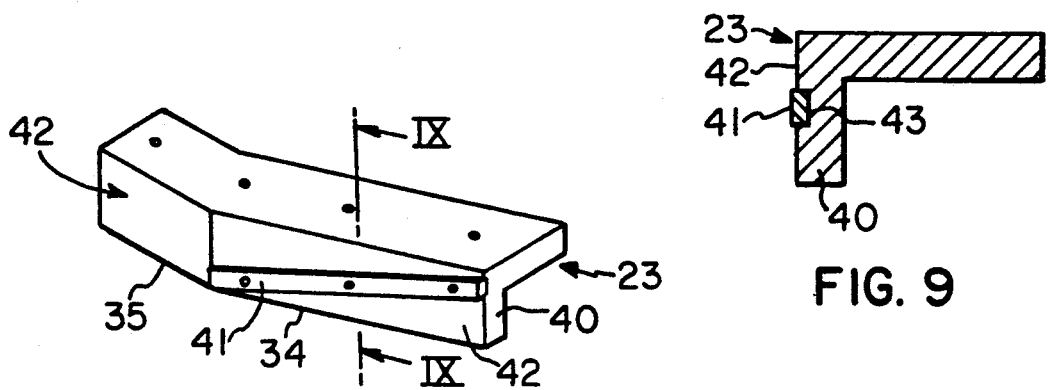
FIG. 8
FIG. 9

INDUSTRIAL LIFT TRUCK

BACKGROUND OF THE INVENTION

1. Field of the Invention

This invention relates generally to an industrial lift truck and more particularly to the arrangement for positioning the battery container on an electrically operated industrial lift truck and for retaining it in position.

2. Description of Prior Art

In a conventional electrically operated industrial lift truck a load carriage is mounted on a vertical mast which is mounted for movement along spaced straddle legs. The battery which is the power source for the truck is located in a DIN battery container supported on the straddle legs and located between the mast and the operator's seat. The battery container is movable along the spaced straddle legs by a shift mechanism when it is necessary to check the battery or remove it for recharging or replacement. In its rear stored position, the DIN battery container is located beneath a cover forming a part of the body of the truck in the area of the operator's seat. The battery container and the battery located therein are moved from the stored position below the cover into its forward open position when the shift mechanism is actuated.

A standard DIN battery container is a rectangular, open topped box which is mounted transversely of the shift mechanism bridging the spaced straddle legs of the truck. Two different arrangements are presently used to mount a battery container on a lift truck. In a first arrangement, the battery container is located on a tray mounted bridging the spaced straddle legs for connection with the shift mechanism for movement between the rear stored position and forward open position. The battery container and the battery are both positioned transversely of the straddle legs and are physically restrained from lateral movement by upturned edges on the tray. In a second arrangement, the battery container is provided with downwardly projecting feet which are placed in apertures in a flat platform which replaces the tray. The platform is aesthetically more pleasing than the tray, but the feet on the bottom of the container make the DIN battery container a special container and therefore more expensive.

SUMMARY OF THE INVENTION

An object of the invention is to mount a standard DIN battery container without employing a tray, for aesthetic reasons, and without using feet on the bottom of the container because of the cost. The invention is also applicable to battery containers other than standard DIN battery containers.

The invention is used in electrically operated industrial lift trucks having a body structure which includes an operator's seat, spaced apart substantially parallel straddle legs projecting laterally from the body structure, a vertical lift mast movable along the straddle legs by a conventional drive, a battery mounted in a container supported on and bridging the straddle legs, a shift mechanism to move the battery container along the straddle legs between a rear stored position and a forward open position, and means for locating the battery container when it is in the stored position below a cover mounted on the vehicle body structure. The end walls of the battery container extend longitudinally of the straddle legs, and guides are located below the cover and internally of the end walls of the battery container. The guides direct the battery container during its movement into the rear stored position and prevent movement of the container transversely of the straddle legs when the battery container is in the rear stored position.

Preferably, each end wall of the battery container has at least one aperture adjacent to its upper edge to permit the battery container to be lifted on and off the truck and the wall portion surrounding the aperture are reinforced. It is arranged that the guides engage the reinforced wall portions when the battery container is in the rear stored position.

In one embodiment of the invention, the guides are a track member associated with each end wall of the battery container. Each track member has a forwardly extending portion which converges longitudinally to provide a V-shaped entrance to adjust the position of the battery container transversely of the straddle legs as it is moved into its rear stored position. At least the surface of each track member which engages the internal surface of an end wall of the battery container is formed of or is covered with a strip of a hard plastic material such as nylon.

Alternatively, each track member may be constructed of a hardened steel and has along at least a portion of its length and in the surface which engages the internal surface of an end of the battery container, a longitudinal groove and a contact member of hard plastic material is mounted in the groove. The outer surface of the contact member is flush with or slightly raised relative to the adjacent surface of the track member. Preferably, in each track member the groove and the contact member therein extend substantially completely along the length of the portion of the track member containing the groove.

If desired, each track member may have a plurality of rollers rotatably mounted thereon and positioned along the desired guide path for the battery container.

In another embodiment of the invention, the guides for the battery container are pivotally mounted for movement by contact with the battery container as it is moved into the rear stored position. The pivotal movement of the guides serves to align the battery container transversely on the spaced straddle legs. The guides are a pair of levers mounted for pivotal movement in opposite directions when engaged by the battery container. Each lever pivots between an inner position and an outer position in contact with an end wall of the battery container when the battery container is shifted to its rear stored position. Each pivotal lever has a downwardly projecting flange which is engaged by the back wall of the battery container during movement of the battery container into the rear stored position so that movement of the battery container will pivot the levers outwardly.

The levers are biased toward inwardly by springs but when they are in their outer position they are maintained in that position by contact with the battery container while it remains in the rear stored position. Subsequently, when the battery container is moved into its forward open position the levers are pivoted inwardly into their inner position by the springs.

Preferably the battery container is supported on the spaced straddle legs by a platform on which the battery container rests. A connection is provided between the platform and the shift mechanism to move the battery container between its rear stored position and its forward open position. The platform has front and back stop means to prevent relative movement of the battery container longitudinally of the straddle legs.

It is also preferred that the platform has parallel sliding surfaces on its upper surface on which the battery container rests, thereby assisting adjustment of the position of the battery container transversely of the spaced straddle legs during movement from the forward open position into the rear stored position. The sliding surfaces may be formed of a hardened steel or a hard plastic material such as nylon.

In another embodiment of the invention the platform has rollers mounted thereon which support the battery container. The rollers assist movement of the battery container relative to the platform in a direction transversely of the spaced straddle legs. The rollers are rotatably mounted below the platform and project upwardly through slots in the platform to contact the bottom of the battery container.

Preferably the conventional vehicle drive means includes a shift mechanism for moving the battery container between the rear stored position and the open forward position. Alternatively, the shift mechanism may be separately powered.

A complete understanding of the invention will be obtained from the following description when taken in connection with the accompanying drawings wherein like reference characters identify like parts throughout.

BRIEF DESCRIPTION OF THE DRAWINGS

FIG. 6 is a perspective view of the platform from below;

FIG. 7 is a perspective view of another embodiment of the platform;

FIG. 8 is a perspective view of another embodiment of the guide track;

FIG. 9 is a section on line IX—IX of FIG. 8;

DESCRIPTION OF THE PREFERRED EMBODIMENT

Figure 1:
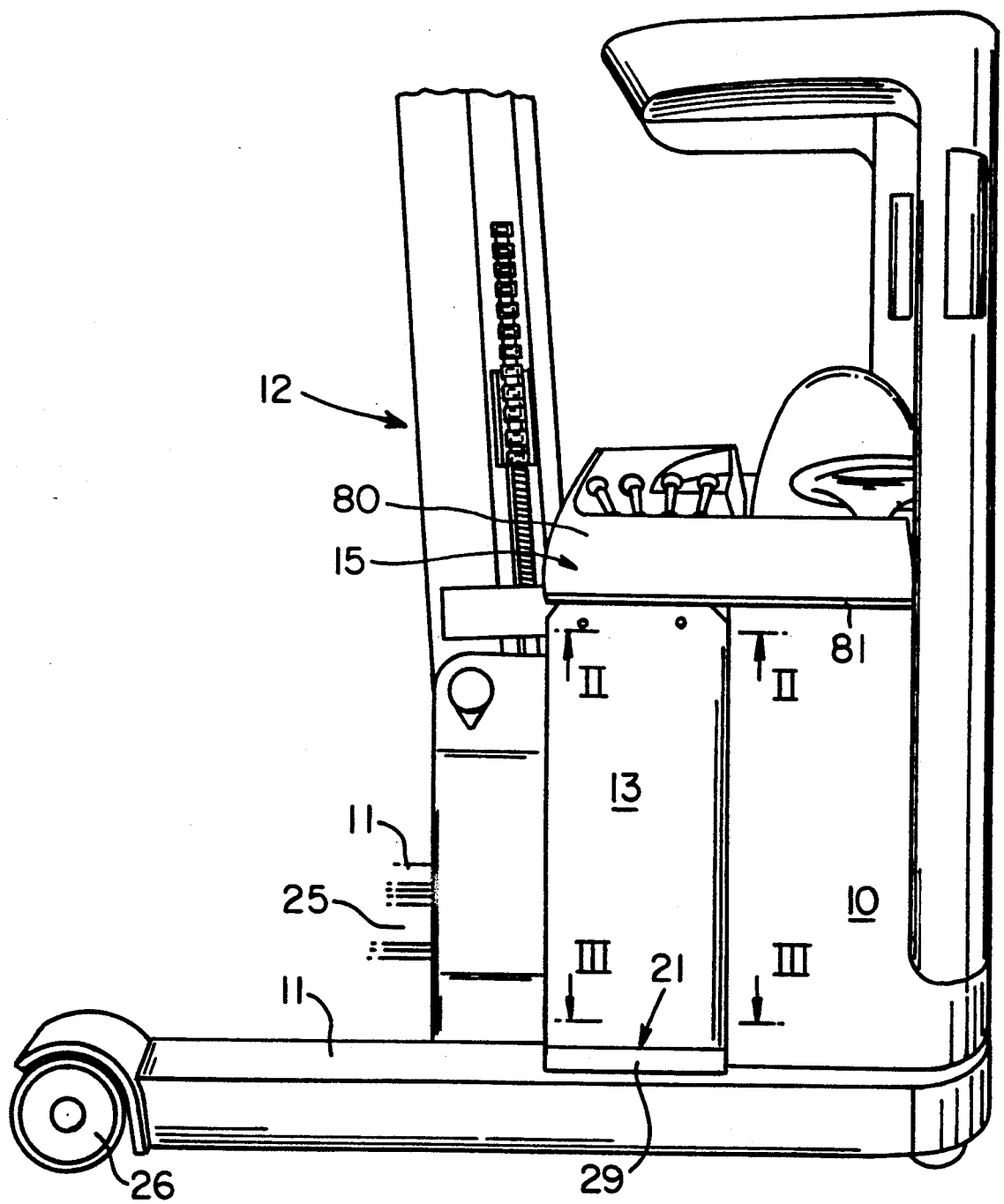
FIG. 1 is a side elevation of an industrial lift truck.

Referring to FIGS. 1–6 of the drawings, an electrically operated industrial lift truck includes a body 10 having an operator's seat at the truck controls. Spaced straddle legs 11 extend horizontally from the body, and a lift mast 12 with a lifting carriage and forks (not shown) is mounted on the straddle legs for movement along the straddle legs in both directions by a conventional drive arrangement which includes a shift mechanism 55 having a horizontally acting hydraulic jack 50. Spaced straddle legs 11 have inwardly facing channels 25 for wheels 26 of shift mechanism 55. Channels 25 are cut out at the forward end of each straddle leg to mount wheels 26.

A standard DIN battery container housing 13 for a battery 14 which is the power source for the lift truck is supported on a platform 21 which is also mounted on the straddle legs.

Battery container 13 is movable along spaced straddle legs 11 between a rear stored position below a cover 15 and a forward open position by a releasable shift mechanism connected with the truck drive arrangement or by a separately powered shift mechanism. In the forward open position, battery 14 can be checked, or battery container 13 and battery 14 can be removed from the truck for recharging or replacement of the battery. Subsequently, battery container 13 is returned to its rear stored position below cover 15.

The upper portion 80 of cover 15 may be made of a molded plastic material or of metal. A structural ridge 81 extends forwardly of the body of the truck at the base of the cover.

Figure 4:
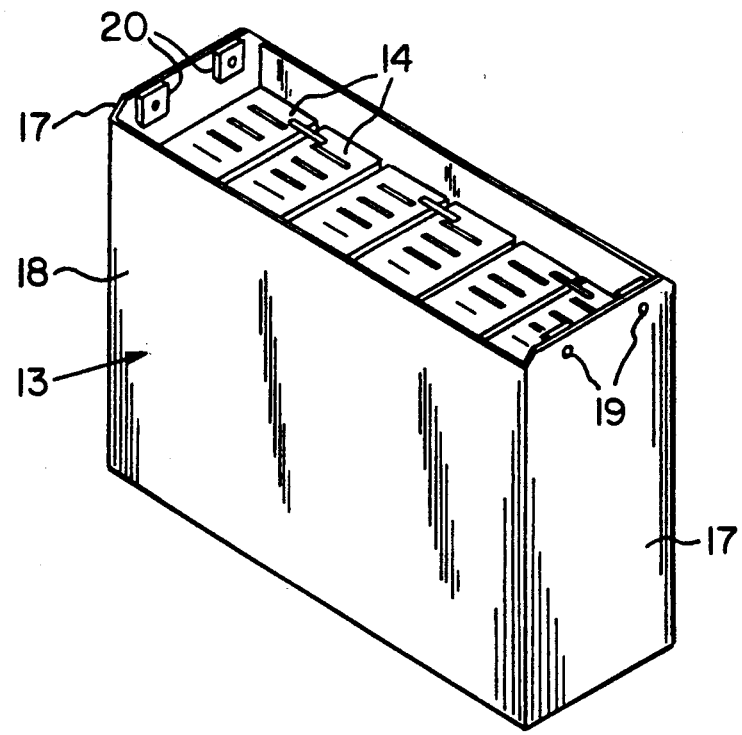
FIG. 4 is a perspective view of a battery container having a battery therein.

The standard DIN battery container 13 shown in FIG. 4 of the drawings is a rectangular, open topped box capable of bridging spaced straddle legs 11 of the truck. The end walls 17 of battery container extend parallel to the straddle legs and project upwardly above the upper edges of side walls 18 which extend across the straddle legs. Each end wall 17 has a central aperture formed therein or, as shown in FIG. 4 of the drawings, a pair of spaced apertures 19 located adjacent to the upper edge to enable the battery container and the battery to be lifted from or placed onto the straddle legs. The area of each end wall surrounding each aperture 19 is provided with a welded internal support plate 20 which provides reinforcement during lifting of the battery container. If each end wall 17 has a central aperture only one reinforcement plate 20 is provided on each end wall.

Figure 5:
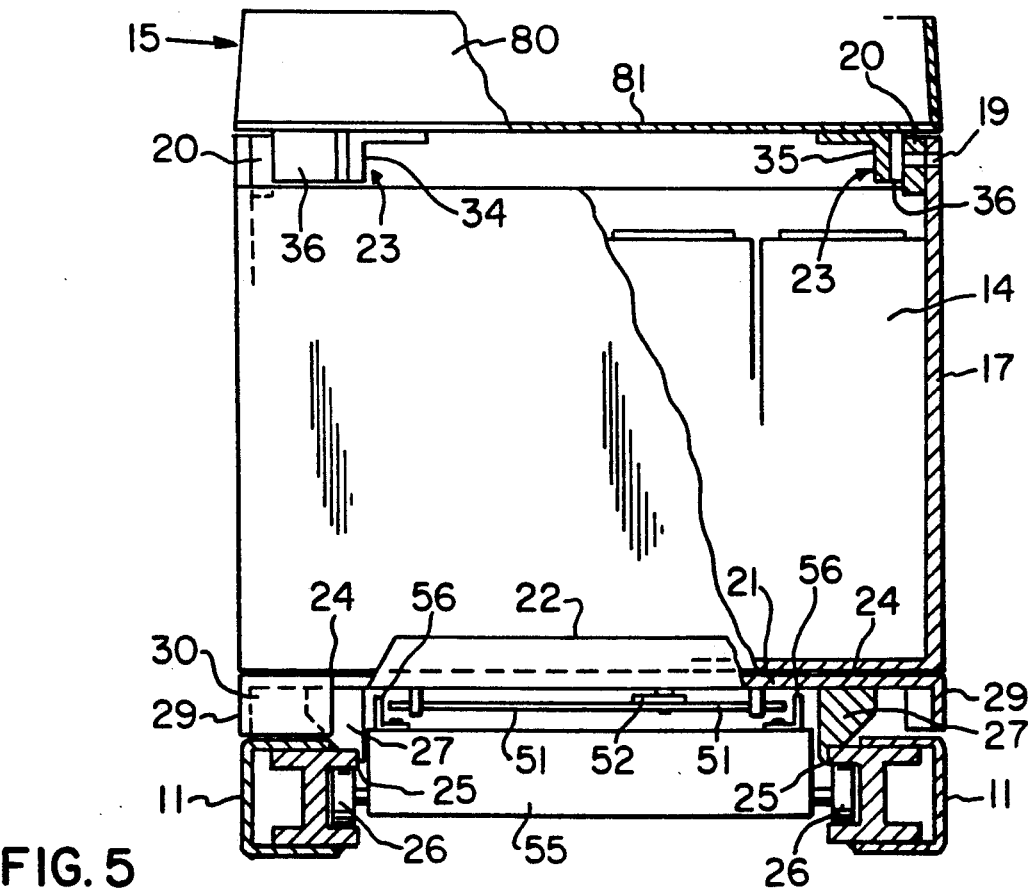
FIG. 5 is a vertical section showing the platform in its rear stored position with the battery container mounted thereon.

Platform 21 on which the battery container 13 rests is supported on straddle legs 11. As in the case of the conventional mounting trays, platform 21 can be locked into the rear position with shift mechanism 55 by two parallel offset bars or latches 51 which are mounted on the lower surface of the platform and extend transversely of spaced straddle legs 11. In the embodiment shown in FIGS. 1–6 of the drawings, both latches 51 are movable in opposite directions by a pivotally mounted pawl 52 so that the latches engage or disengage lugs 56 which project upwardly from the shift mechanism. The platform 21 is thereby locked and unlocked to the shift mechanism. A spring 54 urges latches 51 outwardly into a position ahead of lugs 56 of the shift mechanism, but when platform 21 is moved to the rear stored position latches 51 are held in the withdrawn position by a vertical pin 57 mounted on truck body 10 which engages a notch 53 in pawl 52. In the unlocked condition, shift mechanism 55 can be moved along spaced straddle legs 11. During the operation of the truck, platform 21 and battery container 13 supported therein are locked in the rear stored position. When the shift mechanism 15 is in its rear stored position, pin 57 is released from notch 53 in pawl 52 which allows spring 54 to pivot the pawl to move latches 51 outwardly to engage with lugs 56 of the shift mechanism. Operation of jack 50 will then move platform 21 with battery container 13 resting thereon forwardly into the forward open position shown in FIG. 3 of the drawings. Subsequently, by withdrawing the shift mechanism, platform 21 and battery container 13 are moved back into the rear stored position shown in FIGS. 1 and 5 of the drawings. Buffers on a part of the shift mechanism engage either the platform or the battery container. As shown in FIG. 5 of the drawings, oppositely disposed pairs of blocks 27 are attached to the lower surface of platform 21 in sliding engagement with the upper surfaces of the straddle legs to support platform 21 on the straddle legs so that it can slide between the rear stored position and the forward open position. Blocks 27 are notched along their lower outside edges at 28 so that each pair of blocks sits on and is located inwardly of channel 25 of a straddle leg. Straddle legs 11 are thereby adapted to support platform 21 and battery container 13 thereon and to guide the platform during movement between the rear stored position and the forward open position. The blocks 27 also space the lower surface of platform 21 above the upper surfaces of straddle legs 11 and the gap therebetween is concealed from view by turned down ends 29 and front portions 30 formed on the platform.

When the battery container is in the rear stored position it must be prevented from moving laterally relative to the platform and must be positively located relative to straddle legs 11 so that the battery container and the battery located therein are correctly balanced during movement of the truck.

To prevent relative longitudinal movement of battery container 13 along the straddle legs, the battery container is located on platform 21 between front and back stop flanges 22 which are formed by upturned edge portions of platform 21. In practice, flanges 22 are not readily visible to an observer of the truck because the front flange is concealed by the mast 12 and the back flange is located behind battery container 13.

Figure 2:
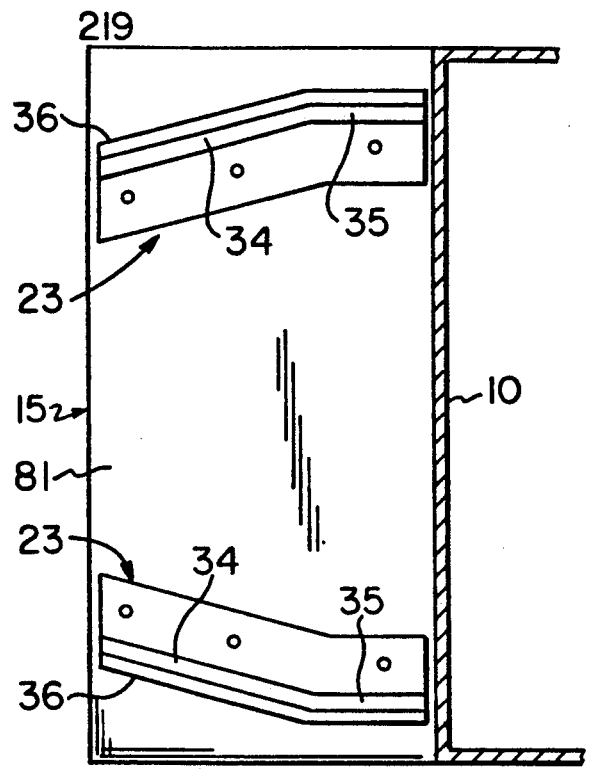
FIG. 2 is a section on line II—II of FIG. 1 showing a battery guide on the lower surface of the cover.
Figure 3:
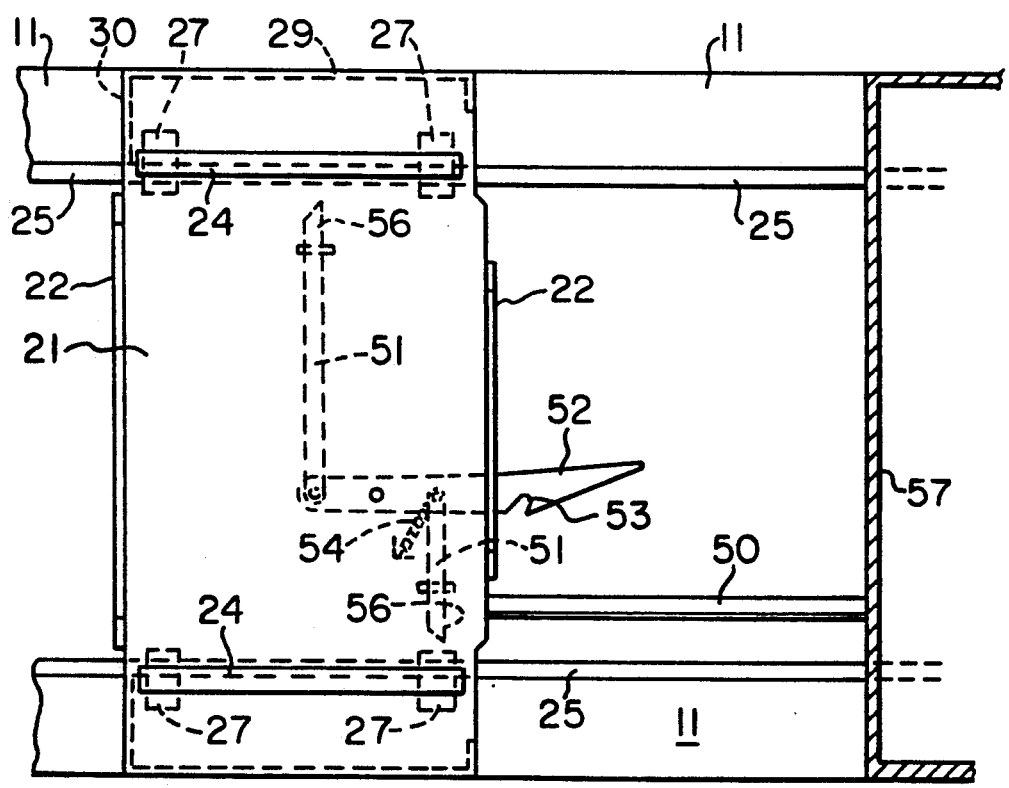
FIG. 3 is a section on line III—III in FIG. 1 showing the platform for the battery container in its forward open position.

In order to prevent movement of the battery container transversely of spaced straddle legs the internal surfaces of end walls 17 of battery container 13 contact outwardly facing surfaces of track members 23 mounted on the lower surface of structural part 81 of cover 15. The battery container is thus positively restrained against relative horizontal movement in all directions. As shown in FIGS. 2 and 5 of the drawings and described in detail hereinafter protective strips 36 on parallel portions 35 of track members 23 contact the rear reinforcing plates 20 rather than end walls 17 of the battery container. This arrangement provides added resistance to buckling of the end walls during turning movements of the truck.

Track members 23 also serve to guide the battery container 13 into its stored position, and if necessary, to align the battery container transversely of straddle legs 11, relative to platform 21. For this purpose, the track members 23 have forwardly extending portions 34 which converge longitudinally of the straddle legs to provide a V-shaped entrance to guide the battery container. Conveniently the track members 23 are lengths of metal right angles attached to the lower surface of cover 15.

To reduce possible damage to track members 23 or to battery container 13, the contact surface of each track member 23 is provided with a replaceable strip 36 of a hard wearing plastic material such as nylon which is screwed to the track members. The thickness of the track members 23 is such that the track members are disposed above the upper edges of side walls 18 of battery container 13, which in a standard DIN battery container are lower than the upper edges of end walls 17.

Two parallel strips 24 are made of a polished steel or of nylon or other hard plastic materials and are mounted on the upper surface of platform 21. The strips extend parallel to the straddle legs and provide sliding surfaces which assist lateral movement of the battery container relative to platform 21. Alternatively, platform 21 may be provided with corresponding slide strips extending transversely of the straddle legs.

In operation, to check or replace battery 14 in battery container 13, notch 53 in pawl 52 is released from pawl holding pin 57 which allows pawl 52 to pivot and move latches 51 outwardly into engagement with the respective lugs 56 of shift mechanism 55. Jack 50 is then extended to move the shift mechanism and platform 21 forwardly along straddle legs 11 into the open forward position shown in FIG. 3 of the drawings. Battery container 13 is thereby removed from the rear stored position below cover 15 and the battery container can be lifted off platform 21 by chains or hooks inserted into apertures 19.

After checking or replacing the battery, battery container 13 and a battery 14 located therein are placed onto platform 21 between flanges 22 and is positioned transversely of spaced straddle legs 11. Jack 50 is then retracted to return platform 21 and battery container 13 supported thereon into the rear stored position below cover 15. Pawl 52 passes through a slot in the truck body to lock on pin 57 in notch 53. During this return movement of platform 21 the nylon covered converging portions 34 of track members 23 centralize the battery container relative to both platform 21 and spaced straddle legs 11. With the container in its rear stored position, nylon strips 36 on parallel portions 35 of track members 23 are in contact with reinforcing plates 20 on end walls 17 of the battery container as shown in FIG. 5 of the drawings. Any lateral adjustment of battery container 13 which is required during its movement into the rear stored position is assisted by slide strips 24 on platform 21 on which the container can easily slide relative to the platform.

If battery container 13 has only on centrally positioned aperture 19 and one reinforcing plate 20 at each end, the converging portions 34 are more sharply angled so that, as before, nylon strips 36 on the parallel portions 35 of tracks 23 contact the reinforcing plates when the battery container is moved to its rear stored position.

In the embodiment of the invention shown in FIG. 7 of the drawings, a battery container (not shown) can be moved laterally off an end of platform 21 instead of being lifted off of the platform. For this purpose, platform 21 has lateral slots formed therein through which the upper surfaces of rollers 33 project. The rollers 33 are rotatably mounted between parallel beams 31 which are attached to the lower surface of platform 21 within the spaced created by blocks 27.

With the platform 21 in its open forward position, a battery container 13 is pushed onto the platform from one end and moves across the platform on rollers 33. The battery container then rests on the rollers between flanges 22 and is in approximately the desired position transversely on the spaced straddle legs. The shift mechanism is now operated to move platform 21 and battery container 13 supported thereon toward its rear stored position. As in the previous embodiment, the converging portions 34 of track members 23 act to transversely adjust the location of battery container 13 until the parallel portions 35 of trucks 23 contact reinforcing plates 20. Movement of the battery container is facilitated by rollers 33.

It will be appreciated that in each embodiment described above the generally flat platform 21 on which battery container 13 rests is more aesthetically pleasing than the conventional battery mounting tray. Moreover, track members 23 allow the use of a standard DIN battery container instead of a more expensive special container such as, for example, a container with feet.

In another embodiment of the invention, each track member 23 may be formed by a plurality of rollers rotatably mounted on the lower surface of cover 15 to form a path wherein the innermost roller constitutes the positive location means for contact with reinforcing plate 20 to prevent movement of battery container 13 transversely of straddle legs 11 when the battery container is in its rear stored position. In this case, the rollers are formed of, or at least the operative peripheral surface of each roller is covered with, a hard plastics material such as nylon.

The hard plastic surface on the rollers or on track members 2 provides low friction contact between the corners and surfaces of battery container 13 and the track members. This is particularly important when the battery container first makes contact with one of the track members 23 and during the lateral movement of the battery container on platform 21. The low friction contact serves to assist sliding the battery container and reduces damage to track members 23 and/or to the battery container.

Track members 23 or the corresponding rollers may also be formed of a hardened steel or may be molded from a suitable hard plastic material such as nylon. Track members made of a hardened steel tend to polish the edges and surfaces of the battery container with which they make contact during repeated operations. On the other hand, track members made of a hard plastic material minimize damage and provide low friction contact.

In the embodiment of the invention shown in FIGS. 8 and 9 of the drawings each track member 23 (only one of which is shown) includes a support member 40 of hardened steel and an insert contact member 41 formed of a hard plastic material such as nylon. Support member 40 is formed by a length of angle which is attached by screws to cover 15 adjacent the lower surface and which has a groove 43 in surface 42 which is adjacent to battery container 13 extending longitudinally over at least the length of the converging portion 34 of the track member. A contact member 41 is located in groove 43 and has an outer surface which is either flush with or slightly raised from surface 42 of support member 40. In the latter case a degree of compression of contact member 41 is possible which may be advantageous. Contact member 41 is held in groove 43 by either screws or an adhesive.

The combination of the hardened steel support member 40 and plastic contact member 41 in each track member 23 effectively provides both low friction contact and hard wearing characteristics. Moreover, in this embodiment, groove 43 and contact member 41 located therein extend substantially diagonally along the converging portion 34 of each track member 23, i.e., at an angle to the horizontal. Contact member 41 thereby acts to wipe a continuously varying surface of the battery container which spreads the area of engagement, while maintaining low friction and wear resistance. When battery container 13 is in contact with the parallel portions 35 of track members 23, the battery container is laterally aligned relative to platform 21 and to the truck body. If desired each contact member 41 may extend along the full length of the track member.

Figure 10:
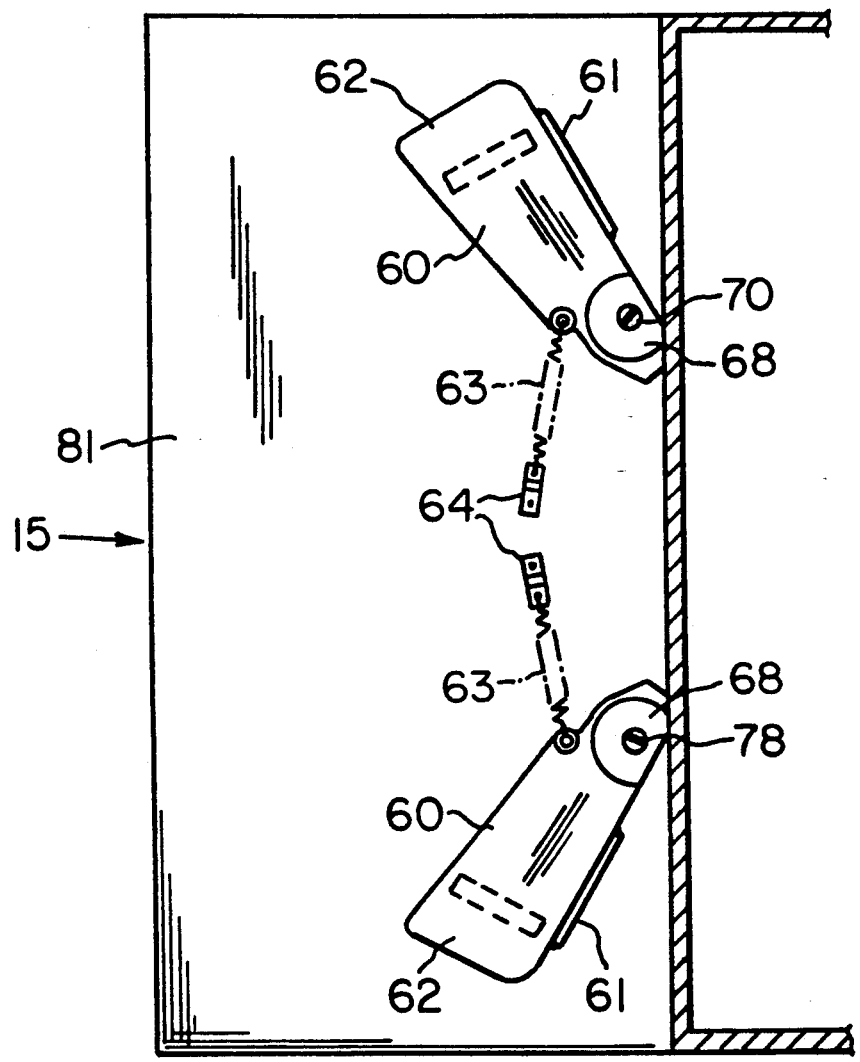
FIG. 10 is a horizontal section showing a second embodiment of a guide attached to the lower surface of the cover.
Figure 11:
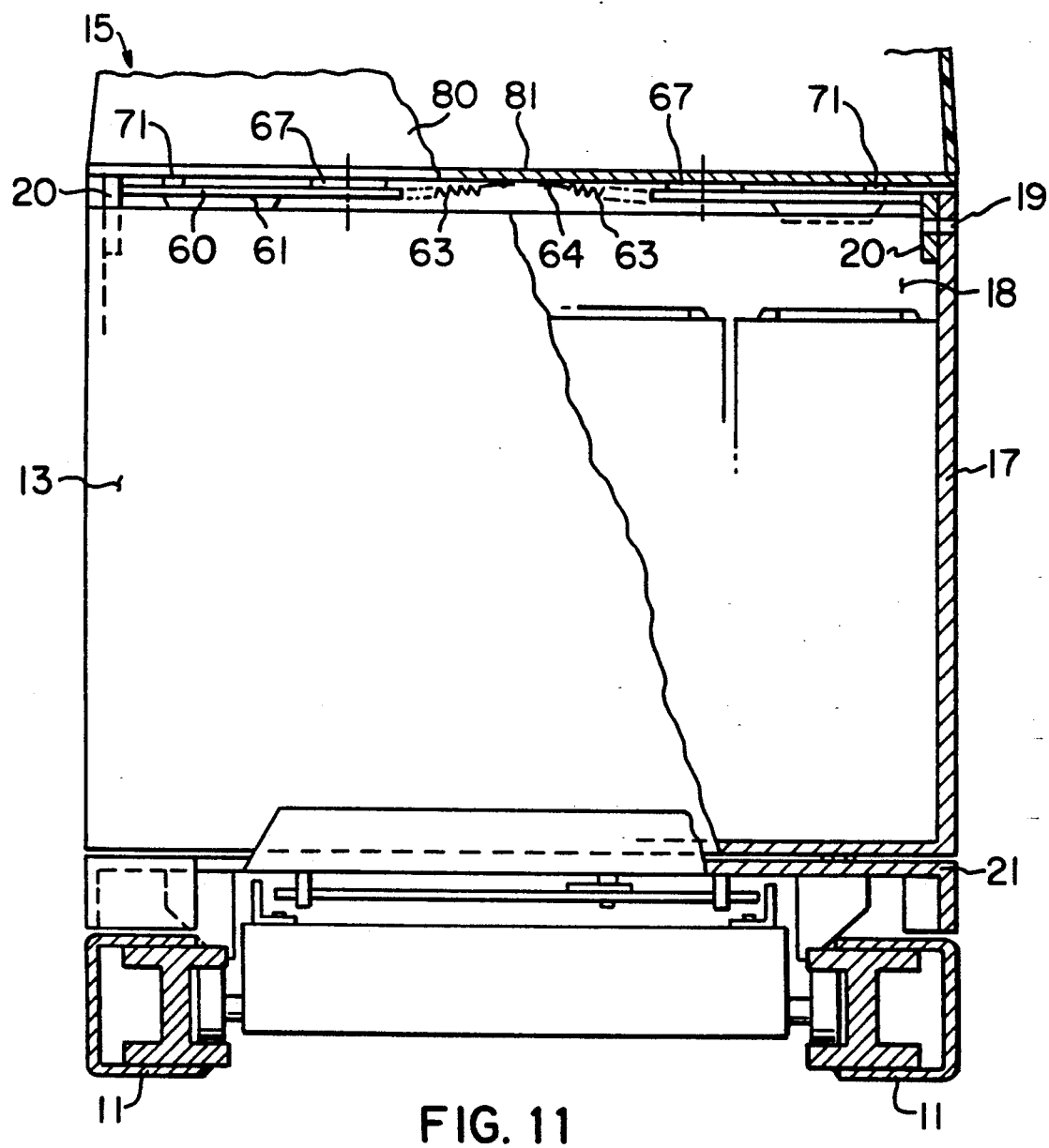
FIG. 11 is a vertical section of FIG. 10 with the battery container in its rear stored position.
Figure 12:
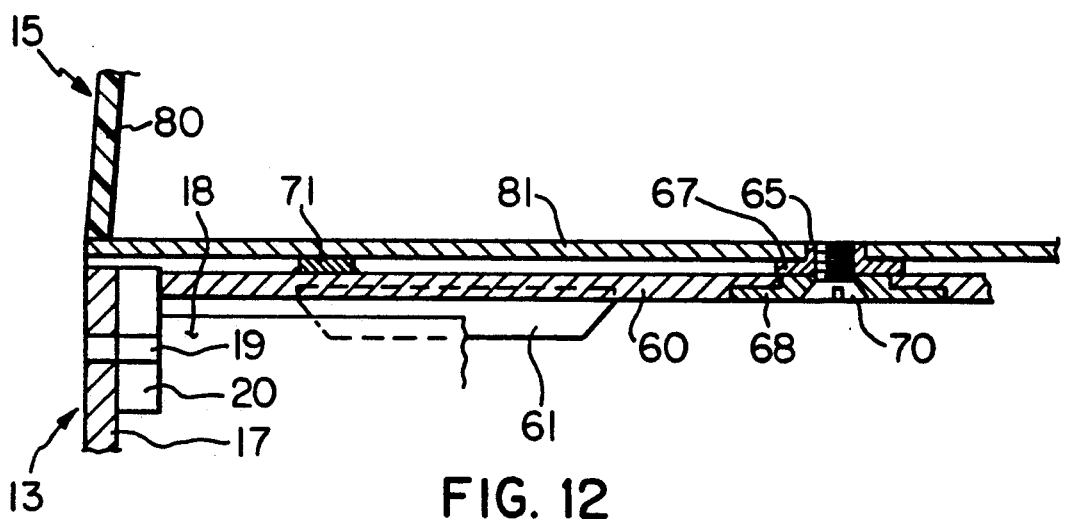
FIG. 12 is a detailed vertical section showing a pivotally mounted lever of the guide shown in FIGS. 10 and 11.

FIGS. 10-12 of the drawings show an industrial lift truck similar to the truck of the previous embodiments of the invention, but with different guide means for guiding battery container 13 during its movement into the rear stored position and for preventing movement of the battery container transversely of the straddle legs when it is in the rear stored position. The previous embodiments of the invention have fixed guide means, whereas this embodiment has pivotably mounted guide means which move with the battery container during its movement into the rear stored position. Oppositely acting horizontal levers 60 are pivotally mounted on structural part 81 of cover 15 adjacent to the lower surface of the cover. Each plate has a downwardly directed flange 61 at its rear edge for engagement by the rear side wall 18 of battery container 13. The outer edge 62 of each lever 60 engages the inner surface of the strengthening member 20 on an end wall 17 of battery container 13 when the battery container is in the rear stored position. The two levers prevent movement of the battery container transversely of the spaced straddle legs. In this embodiment, each lever 60 engages a reinforcing plate 20 which is on the end wall 17 of battery container 13 at the location of apertures 19.

In this embodiment, springs 63 bias levers 60 into their inner positions when the battery container is moved into its forward open position. Each spring 63 is attached at one end to a lever 60 and at the other end to an anchor member 64 screwed into structural part 81 of cover 15. In another embodiment, the anchor member 64 for each spring 63 may be an abutment engaged by the end of the spring.

As shown in FIG. 12 of the drawings, a flanged support boss 65 is inserted into an aperture in structural part 81 of cover 15 at the pivot point of each lever 60. Bosses 65 are welded to cover 15 and each boss has a threaded bore and a flange 67 to space lever 60 downwardly from the lower surface of structural part 81. A recessed support cap 68 is inserted into a counterbore in lever 60 and is attached to boss 65 by a countersunk flat head screw 70. Each lever 60 is thereby able to pivot relative to cap 68 and boss 65 about the longitudinal axis of screw 70. A spacer bar 71 is welded to the upper surface of the outer end of each lever 60 to prevent the plate from contacting the lower surface of structural part 81 when it is pivoted by contact with battery container 13. Instead of a spacer bar 71, a roller may be provided which is mounted to rotate against the lower surface of structural part 81.

In the operation of the embodiment of the invention shown in FIGS. 10-12 of the drawings, when the shift mechanism is operated to move battery container 13 from its open forward position to its rear stored position pivotally mounted levers 60 are in their inner positions. During the rearward movement of the battery container, the back side wall 18 of battery container 13 contacts flanges 61 on levers 60 and pivots both levers outwardly away from each other in opposite directions about its respective vertical axis. If battery container 13 is transversely out of alignment on platform 21, the appropriate lever 60 will be pivoted into engagement with the inner surface of the respective end wall 17 of battery container 13, either directly, if reinforcing plates 20 are omitted, or indirectly by contacting a rear reinforcing plate 20. Further pivotal movement will then move the battery container laterally in the same direction until the battery container is aligned on platform 21. The levers 60 then prevent the battery container from moving transversely of the spaced straddle legs.

One advantage of the movable guide means of this embodiment of the invention is that the movement of a lever 60 in the same general direction in which battery container 13 is to be shifted assists the adjustment of the position of the battery container on platform 21. Also, there is substantially no sliding movement between the same lever 60 and the end wall 17 of battery container 13 and wear of the battery container and/or the lever or track member is minimized.

A further advantage of the embodiment shown in FIGS. 10-12 of the drawings is that a greater degree of adjustment of battery container 13 on platform 21 is possible than in the case of stationary track members.

The embodiments have been described in connection with a standard DIN battery container but it will be understood by those skilled in the art that the guide means of the invention may be employed with other battery containers having end walls which can be contacted by the guide means. For example, if a battery container has sufficiently thick end walls 17, reinforcing plates 20 may be omitted. The stationary track members or movable levers would then directly contact the end walls 17 of the battery container.

Also, in each embodiment described above, the guide members are suspended from structural part 81 of cover 15. However, another form of structural support for mounting the guide means may be provided if desired. For example, the structural support could be struts or brackets extending forwardly from the body structure 10 of the truck.

While specific embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

We claim:

1. An industrial lift truck having a body including an operator's seat and a cover means, spaced straddle legs projecting from said body, a lift mast movable along said spaced straddle legs, means for moving said lift mast along said straddle legs, a battery for operating said means for moving said lift mast, a container for said battery having end walls, a front wall, a rear wall and a bottom wall, means for supporting said battery container on said spaced straddle legs, shift means for moving said battery container along said spaced straddle legs between a rear stored position and a forward open position, the end walls of said battery container extending parallel to said spaced straddle legs and guide means located below said cover means and disposed internally of said end walls of said battery container for contacting the inner surfaces of said end walls, whereby said guide means directs said battery container during movement into said rear stored position and prevents movement of said battery container transversely of said spaced straddle legs when in said rear stored position.

2. A truck as set forth in claim 1, including at least one aperture formed adjacent the upper edge of each of said end walls of said battery container and reinforcing means on the inner surface of each of said end walls surrounding said aperture, whereby said guide means engage said reinforcing means when said battery container is in said rear stored position.

3. A truck as set forth in claim 2, wherein said guide means is spaced track members depending from the lower surface of said cover means and associated with said end walls of said battery container, said track members have forwardly extending converging portions providing a V-shaped entrance guide for said battery container to transversely adjust the position of said battery container on said spaced straddle legs as said battery container is moved into said rear stored position.

4. A truck as set forth in claim 1, wherein said guide means is spaced track members depending from the lower surface of said cover means and associated with said end walls of said battery container, said track members have forwardly extending converging portions providing a V-shaped entrance guide for said battery container to transversely adjust the position of said battery container on said spaced straddle legs as said battery container is moved into said rear stored position.

5. A truck as set forth in claim 4, wherein each of said track members has a surface for engaging the internal surface of one of said end walls of said battery container.

6. A truck as set forth in claim 5, including a strip of a hard plastic material on each of said surfaces, whereby said strip of hard plastic material engages said internal surface of one of said end walls of said battery container.

7. A truck as set forth in claim 4, wherein each of said track members is molded from a hard plastic material.

8. A truck as set forth in claim 4, wherein each of said track members is formed of a hardened steel.

9. A truck as set forth in claim 8, wherein each of said hardened steel track members has a longitudinal groove formed along at least a portion of its length in the surface which engages the internal surfaces of one of said end walls of said battery container and a hard plastic material contact member mounted in said groove to engage said internal surface of one of said end walls of said battery container.

10. A truck as set forth in claim 9, wherein said contact in each of said track member extends substantially diagonally of the length of the portion of said track member containing said groove.

11. A truck as set forth in claim 1, wherein said guide means are pivotally mounted on the lower surface of said cover means to align said battery container transversely of said spaced straddle legs during movement of said battery container into said rear stored position.

12. A truck as set forth in claim 11, wherein said pivotally mounted guide means comprise a pair of levers mounted at one end for pivotal movement in opposite directions when engaged by said battery container, each of said levers pivoting between an inner position and an outer position in contact with one of said end walls of said battery container when said battery container is in said rear stored position.

13. A truck as set forth in claim 12, wherein each of said levers includes a downwardly projecting portion on one edge for engagement by said rear wall of said battery container during movement of said battery container into said rear stored position, whereby subsequent movement of said battery container pivots said levers into said outer position.

14. A truck as set forth in claim 12, including means for biasing said levers toward said inner position and said levers being maintained in said outer position by contact with said end walls of said battery container when in said rear stored position.

15. A truck as set forth in claim 14, wherein said means for biasing said levers toward said inner position are springs.

16. A truck as set forth in claim 1, wherein said means for supporting said battery container on said spaced straddle legs is a platform on which said battery container rests and said shift means for moving said battery container between said rear stored position and said forward position extends between said platform and said truck.

17. A truck as set forth in claim 16, wherein said platform includes front stop means and rear stop means, wherein said battery container is located between said front and rear stop means when positioned on said platform to prevent movement of said battery container parallel to said spaced straddle legs.

18. A truck as set forth in claim 17, wherein said platform includes parallel slide members on the upper surface for supporting said battery container whereby said slide members assist the adjustment of said battery container on said platform during movement of said platform between said open forward position into said rear stored position.

19. A truck as set forth in claim 16, wherein said platform includes rollers for supporting said battery container, whereby said rollers assist the adjustment of said battery container on said platform in a direction transversely of said spaced straddle legs.

20. A truck as set forth in claim 19, including means on the lower surface of said platform rotatably mounting said rollers on said platform, and spaced slots formed in said platform, whereby said rollers project upwardly through said spaced slots in said platform to contact said bottom wall of said battery container.

* * * * *